(12) United States Patent
Rodgers et al.

(10) Patent No.: US 8,476,352 B2
(45) Date of Patent: Jul. 2, 2013

(54) ELASTOMERIC COMPOSITIONS COMPRISING HYDROCARBON POLYMER ADDITIVES HAVING IMPROVED IMPERMEABILITY

(75) Inventors: Michael B. Rodgers, Seabrook, TX (US); Rick D. Davis, Ijamsville, MD (US); Anthony J. Dias, Houston, TX (US); Weiqing Weng, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/492,837

(22) Filed: Jun. 26, 2009

(65) Prior Publication Data

US 2010/0036025 A1 Feb. 11, 2010

Related U.S. Application Data

(60) Provisional application No. 61/087,479, filed on Aug. 8, 2008.

(51) Int. Cl.
*C08K 5/04* (2006.01)
*C08K 5/09* (2006.01)

(52) U.S. Cl.
USPC .......... 524/427; 524/52; 524/445; 524/575.5; 524/555; 524/567; 524/426; 524/451; 524/435; 524/449; 525/191

(58) Field of Classification Search
USPC ............... 524/52, 445, 427, 575.5, 555, 567, 524/426, 451, 435, 449; 525/191
See application file for complete search history.

(56) References Cited

U.S. PATENT DOCUMENTS

| | | | |
|---|---|---|---|
| 4,472,538 A | 9/1984 | Kamigaito et al. | |
| 4,540,753 A | 9/1985 | Cozewith et al. | |
| 4,810,734 A | 3/1989 | Kawasumi et al. | |
| 4,889,885 A | 12/1989 | Usuki et al. | |
| 5,162,445 A | 11/1992 | Powers et al. | |
| 7,456,331 B2 | 11/2008 | Kulichikhin et al. | |
| 7,501,460 B1 | 3/2009 | Weng et al. | |
| 7,638,573 B2 | 12/2009 | Wang et al. | |
| 7,649,043 B2 | 1/2010 | Bergman | |
| 2004/0132894 A1* | 7/2004 | Dias et al. | 524/515 |
| 2004/0194863 A1 | 10/2004 | Grah | |
| 2005/0277723 A1* | 12/2005 | Gong et al. | 524/445 |
| 2006/0235159 A1* | 10/2006 | Datta et al. | 525/240 |
| 2007/0015853 A1 | 1/2007 | Weng et al. | |
| 2009/0005493 A1 | 1/2009 | Tse | |
| 2009/0186965 A1* | 7/2009 | Rodgers et al. | 524/52 |

FOREIGN PATENT DOCUMENTS

| | | |
|---|---|---|
| EP | 1 408 074 | 4/2004 |
| WO | WO 02/48257 | 6/2002 |
| WO | WO 2007/070063 | 6/2007 |

OTHER PUBLICATIONS

Richard J. Lewis, Sr. , Hawley's Condensed Chemical Dictionary, Van Nostrand Reinhold, 13$^{th}$ Ed., p. 437.*
*Advances in Tire Innerliner Technologies*, Brendan Rodgers, et al., Rubber World, vol. 234, No. 3, pp. 36-41 (Jun. 2006).
ExxonMobil Chemical, Presentation at The Society of Adhesion and Interface, Korea, Aug. 2001.
Pasternak et al., *A Dynamic Approach to Diffusion and Permeation Measurements*, Journal of Polymer Science: Part A-2, 1970, vol. 8, pp. 467,479.

* cited by examiner

*Primary Examiner* — James J Seidleck
*Assistant Examiner* — Deve E Valdez
(74) *Attorney, Agent, or Firm* — Nancy T. Krawczyk; Jennifer A. Schmidt

(57) ABSTRACT

An elastomeric compositions having improved impermeability is disclosed. The cured elastomeric composition may comprise at least one $C_4$-$C_7$ monoolefin elastomer, a hydrocarbon polymer additive, and a clay. In some embodiments, the cured elastomeric composition has a permeation coefficient at 40° C. of 90 cc*mm/($m^2$-day) or less. In some embodiments, the elastomeric composition is substantially free of naphthenic oil.

25 Claims, No Drawings

US 8,476,352 B2

ELASTOMERIC COMPOSITIONS COMPRISING HYDROCARBON POLYMER ADDITIVES HAVING IMPROVED IMPERMEABILITY

PRIORITY CLAIM

This application claims the benefit of prior U.S. provisional application Ser. No. 61/087,479, filed Aug. 8, 2008 which is hereby incorporated by reference in its entirety.

FIELD OF THE INVENTION

This invention relates to elastomeric compositions having improved impermeability. More particularly, this invention relates to cured elastomeric compositions having improved impermeability comprising hydrocarbon polymer additives.

BACKGROUND OF THE INVENTION

Elastomeric compositions are used in a wide variety of applications, including hoses, belts, footwear components, vibration isolation devices, tires, and tire components such as treads, innerliners, and sidewalls. The selection of ingredients for the commercial formulation of an elastomeric composition depends upon the balance of properties desired, the application, and the application's end use.

For example, in the tire industry the balance between processing properties of the green (uncured) composition in the tire plant and in-service performance of the cured rubber tire composite is of particular importance. The ability to improve the endurance of tires used in a wide variety of conditions, such as is required for agricultural tires, aircraft tires, earthmover tires, heavy-duty truck tires, mining tires, motorcycle tires, medium truck tires, and passenger car tires, while maintaining ease of proccessability of the uncured elastomeric composition is also of significant importance. Additionally, the goals of improving air impermeability properties, flex fatigue properties, and the adhesion of the elastomeric composition to adjoining tire components without affecting the proccessability of the uncured elastomeric composition while maintaining or improving the physical property performance of the cured elastomeric composition still remain.

Conventionally, various processing oils, such as naphthenic, paraffinic, and aromatic oils, have been added to many tire components to aid compound processing. Naphthenic oil has been preferred for tire innerliner compounds due to its processing effectiveness and beneficial secondary properties, e.g., compatibility with isobutylene based elastomers. However, while these conventional processing oils improve proccessability, this benefit may have an undesirable impact on various other properties, including air impermeability.

Generally, the raw ingredients and materials used in tire compounding impact all tire performance variables, thus, any alternative to conventional processing oils must be compatible with the rubbers, not interfere with the vulcanization rate, be easily dispersed in the tire compounds, be cost effective, and not adversely impact tire performance. This is of particular concern for tire innerliners and tire innertubes where performance properties must be maintained within specified tolerance levels. For example, small increases in a tire innerliner compound's 300% modulus can lead to reduction in fatigue resistance and cracks with consequential loss in tire durability. Furthermore, for an elastomeric composition that acts as an air barrier it is of particular importance that any benefits in compound proccessability are not to the detriment of the composition's air retention capabilities.

As oils such as rubber grade naphthenic oil or paraffinic oil tend to increase an elastomeric composition's permeability, halobutyl rubber has been used in tire innerliner compounds to aid in improving air retention. Further improvements in impermeability have been obtained by adding clay to the elastomer to form a "nanocomposite." However, there still remains a need for elastomeric compositions having good proccessability and improved air retention capability.

As many tires are compounded and engineered for particular performance characteristics, it is desirable that any replacement for traditional process oils maintains tire performance characteristics, such as rolling resistance, traction, and wear performance. Improvement in air retention qualities can allow improved maintenance of tire rolling resistance performance through the service life of the tire, improved durability, and lower tire operating temperatures, thus there is still a need for a replacement for traditional process oils in tire and tire innerliner compounds which allows for beneficial compound proccessability and improved tire innerliner impermeability.

SUMMARY OF THE INVENTION

In one aspect, this disclosure relates to an elastomeric composition. The elastomeric composition comprises at least one $C_4$-$C_7$ monoolefin elastomer, a hydrocarbon polymer additive, and a clay.

In another aspect, this disclosure relates to a cured elastomeric composition. The cured elastomeric composition comprises at least one $C_4$-$C_7$ monoolefin elastomer, a hydrocarbon polymer additive, and clay. In some embodiments, the cured elastomeric composition has a permeation coefficient at 40° C. of 90 cc*mm/(m²-day) or less or in other embodiments of 80 cc*mm/(m²-day) or less.

In a further aspect, this disclosure relates to an air barrier, such as a tire innerliner, innertube, or hose. The air barrier comprises an elastomeric composition which is made by the method of combining at least one $C_4$-$C_7$ monoolefin based elastomer, at least one filler, at least one clay, at least one hydrocarbon polymer additive, and at least one cure agent. The combined components are then cured. In some embodiments, the air barrier has a permeation coefficient at 40° C. of 90 cc*mm/(m²-day) or less or in other embodiments of 80 cc*mm/(m²-day) or less.

In one embodiment, and in combination with any of the above disclosed aspects or embodiments, the hydrocarbon polymer additive may be present in the range of 10 to 40 phr. The hydrocarbon polymer additive preferably comprises a cyclic component, and more preferably comprises dicyclopentadiene. The hydrocarbon polymer additive may have a softening point in the range of about 115° C. to about 130° C., as measured by ASTM E28-99.

In a preferred embodiment, and in combination with any of the above disclosed aspects or embodiments, the elastomeric composition and/or air barrier are substantially free of naphthenic oil.

In another embodiment, and in combination with any of the above disclosed aspects or embodiments, the $C_4$-$C_7$ monoolefin based elastomer may be selected from the group consisting of butyl rubber, halogenated butyl rubber, branched ("star-branched") butyl rubber, halogenated star-branched butyl rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

In a further embodiment, and in combination with any of the above disclosed aspects or embodiments, the clay may be an exfoliated clay selected from the group consisting of exfoliated natural or synthetic montmorillonite, nontronite, beidellite, volkonskoite, laponite, hectorite, saponite, sauconite, magadite, kenyaite, steensite, vermiculite, halloysite, aluminate oxides, hydrotalcite, and mixtures thereof.

In still another embodiment, and in combination with any of the above disclosed aspects or embodiments, the elastomeric composition or air barrier may further comprise a filler which may be selected from calcium carbonate, mica, silica, silicates, talc, titanium dioxide, starch, wood flour, carbon black, and mixtures thereof.

These and other objects, features, and advantages will become apparent as reference is made to the following detailed description, preferred embodiments, examples, and appended claims.

DETAILED DESCRIPTION OF THE INVENTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components is present in a given recipe is defined as 100 phr. All other non-rubber components are ratioed against the 100 parts of rubber and are expressed in phr.

The term "elastomer," as used herein, refers to any polymer or combination of polymers consistent with the ASTM D1566 definition, incorporated herein by reference. As used herein, the term "elastomer" may be used interchangeably with the term "rubber."

The elastomeric compositions of the invention can include various elastomers, hydrocarbon polymer additives ("HPAs"), clay, and fillers. In one embodiment, the various elastomers are generally present in the elastomeric composition at 100 phr either alone or in some combination with one another with HPA(s) being present from 5 to 50 phr.

In one embodiment the elastomeric composition is used in a tire or tire component, such as a tire innerliner. In model tire innerliner compounds, the elastomeric composition may comprise: 100 phr of elastomer(s); 5 to 50 phr of HPA(s); optionally, about 50 to about 90 phr of fillers, such as for example, carbon black and/or silica; optionally, about 4 to about 15 phr of clay(s); optionally, about 0.5 to 5 phr of ZnO; optionally, about 1 to about 5 phr of stearic acid; optionally, about 1 to 5 phr of accelerators; optionally, about 0.25 to 1.50 phr of sulfur; and optionally, about 5 phr of other processing aids.

In some embodiments, the HPA(s) can be used in addition to other processing aids and oils, or in other embodiments as a replacement for other processing aids and oils. In a preferred embodiment, the elastomeric composition is substantially free of aromatic oil. Substantially free of aromatic oil is defined to mean that aromatic oil has not deliberately been added to the elastomeric composition, or, in the alternative, if present the elastomeric composition comprises less than 0.5 phr of aromatic oil, or more preferably less than 0.25 phr of aromatic oil, or most preferably less than 0.1 phr of aromatic oil. Aromatic oils are compounds containing at least 35% by mass of single- and multiple-ring components. Generally, aromatic oils contain unsaturated polycyclic components.

In some embodiments, the elastomeric composition may contain naphthenic oil. In other preferred embodiments, the elastomeric composition is substantially free of naphthenic oil. Substantially free of naphthenic oils is defined to mean that naphthenic oil has not deliberately been added to the elastomeric composition, or, in the alternative, if present the elastomeric composition comprises less than 0.5 phr of naphthenic oil, or more preferably less than 0.25 phr of naphthenic oil, or most preferably less than 0. 1 phr of naphthenic oil. Generally, naphthenic oils have a viscosity gravity constant of about 0.85 as described in ASTM D250 1, a glass transition temperature (Tg) of about −60° C., and a nominal aniline point of about 90 as described in ASTM D611.

Elastomer

The elastomeric composition comprises at least one elastomer. Typical elastomers that may be included in the elastomeric compositions are $C_4$ to $C_7$ monoolefin based rubbers, such as butyl rubber (isoprene-isobutylene rubber, "IIR"), branched ("star-branched") butyl rubber, star-branched polyisobutylene rubber, bromobutyl ("BIIR"), chlorobutyl ("CIIR"), random copolymers of isobutylene and para-methylstyrene (poly(isobutylene-co-p-methylstyrene)), halogenated poly(isobutylene-co-p-methylstyrene) ("BIMSM"), polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber ("SBR"), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, any halogenated versions of these elastomers, and mixtures thereof. Preferred elastomers include isobutylene based elastomers such as, IIR, halogenated IIR, and halogenated poly(isobutylene-co-p-methylstyrene). Useful elastomers can be made by any suitable means known in the art, and the invention is not herein limited by the method of producing the elastomer.

In some embodiments, the elastomeric composition comprises a blend of two or more elastomers. Blends of elastomers may be reactor blends and/or melt mixes. The individual elastomer components may be present in various amounts, with the total elastomer content in the elastomeric composition being expressed as 100 phr in the formulation.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ to $C_7$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers such as homopolymers and copolymers of olefins, isoolefins and multiolefins. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene. Halogenation can be carried out by any means, and the invention is not herein limited by the halogenation process.

In one embodiment, the elastomer may be a branched or "star-branched" butyl rubber ("SBB"). The SBB is typically a composition of a butyl rubber, either halogenated or not, and a polydiene or block copolymer, either halogenated or not. In one embodiment, the SBB or halogenated-SBB is a composition of a butyl or halogenated butyl rubber and a copolymer of a polydiene and a partially hydrogenated polydiene selected from the group including styrene, polybutadiene, polyisoprene, polypiperylene, natural rubber, styrene-butadiene rubber, ethylene-propylene diene rubber ("EPDM"), ethylene-propylene rubber ("EP"), styrene-butadiene-styrene and styrene-isoprene-styrene block copolymers. These polydienes are present in one embodiment, based on the monomer wt %, greater than 0.3 wt %, or in another embodiment in the range of 0.3 to 3 wt % or in the range of 0.4 to 2.7 wt %.

The elastomer may be a random copolymer comprising a $C_4$ to $C_7$ isomonoolefin, such as isobutylene and an alkylstyrene comonomer, such as para-methylstyrene, containing at least 80%, alternatively at least 90%, by weight of the para-isomer. In one embodiment, the polymer may be a random elastomeric copolymer of ethylene or a $C_3$ to $C_6$ α-olefin and an alkylstyrene comonomer, such as para-methylstyrene containing at least 80%, alternatively at least 90%, by weight of the para-isomer.

The copolymers may optionally include functionalized interpolymers wherein at least one or more of the alkyl substituents groups present in the styrene monomer units contain a halogen or some other functional group. In one embodiment, up to 60 mol % of the para-substituted styrene present in the random polymer structure may be functionalized. In another embodiment the amount of functionalized para-methylstyrene is in the range of 0.1 to 5 mol %, or in the range of 0.2 to 3 mol %. The functional group may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162, 445, herein incorporated by reference.

In a further embodiment, the elastomer is a random copolymer of isobutylene and para-methylstyrene containing 0.5 to 20 mol % para-methylstyrene wherein up to 60 mol % of the methyl substituent groups present on the benzyl ring contain a bromine or chlorine atom, as well as acid or ester functionalized versions thereof.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 5, alternatively less than 2.5, an exemplary viscosity average molecular weight in the range of 200,000 up to 2,000,000, and an exemplary number average molecular weight in the range of 25,000 to 750,000 as determined by gel permeation chromatography.

The elastomer may be a brominated poly(isobutylene-co-p-methylstyrene) ("BIMSM"). BIMSM polymers generally contain 0.1 to 5% mole of bromomethylstyrene groups relative to the total amount of monomer derived units in the copolymer. In one embodiment, the amount of bromomethyl groups is in the range of 0.2 to 3.0 mol %, or in the range of 0.3 to 2.8 mol %, or in the range of 0.4 to 2.5 mol %, or in the range of 0.3 to 2.0 mol %, wherein a desirable range may be any combination of any upper limit with any lower limit. Expressed another way, exemplary copolymers may contain 0.2 to 10 wt % of bromine, based on the weight of the polymer, or 0.4 to 6 wt % bromine, or 0.6 to 5.6 wt %, in another embodiment they are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer in the range of 0.4 to 3.0 mol % based on the total number of para-methylstyrene, and wherein the para-methylstyrene derived units are present in the range of 3 to 15 wt % or in the range of 4 to 10 wt % based on the total weight of the polymer. In a preferred embodiment, the para-(halomethylstyrene) is para-(bromomethylstyrene).

Commercial embodiments of useful halogenated isobutylene-p-methylstyrene rubbers include the EXXPRO™ elastomers, available from ExxonMobil Chemical Company, Houston, Tex., having a Mooney viscosity (ML 1+8 at 125° C., ASTM D1646) in the range of 30 to 50, a p-methylstyrene content in the range of 4 to 8.5 wt %, and a bromine content in the range of 0.7 to 2.2 wt % relative to the halogenated isobutylene-p-methylstyrene rubber.

In a further embodiment, the elastomer may be at least one non isobutylene based rubber of types conventionally used in tire rubber compounding, and herein referred to as "general purpose rubber." A general purpose rubber may be any rubber that usually provides high strength and good abrasion along with low hysteresis and high resilience.

Examples of general purpose rubbers include natural rubber ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof. Ethylene-propylene rubber ("EP") and ethylene-propylene-diene rubber ("EPDM"), and their mixtures are also referred to as general purpose rubbers.

In one embodiment, the elastomer may include a polybutadiene rubber ("BR"). The Mooney viscosity of the polybutadiene rubber as measured at 100° C. (ML 1+4, ASTM D1646) may be in the range of 35 to 70, or 40 to about 65, or in the range of 45 to 60 in another embodiment. Another useful general purpose rubber is high cis-polybutadiene ("cis-BR"). By "cis-polybutadiene" or "high cis-polybutadiene", it is meant that 1,4-cis polybutadiene is used, wherein the amount of cis component is at least 90%.

The elastomer may be a polyisoprene (IR) rubber. The Mooney viscosity of the polyisoprene rubber as measured at 100° C. (ML 1+4, ASTM D1646) may be in the range of 35 to 70, or 40 to about 65, or in another embodiment in the range of 45 to 60.

The elastomeric composition may comprise rubbers of ethylene and propylene derived units such as EP and EPDM as suitable secondary elastomers. Examples of suitable comonomers in making EPDM are ethylidene norbornene, 1,4-hexadiene, dicyclopentadiene, as well as others. In one embodiment, the elastomeric composition may comprise an ethylene/alpha-olefin/diene terpolymer. The alpha-olefin may be selected from the group consisting of $C_3$ to $C_{20}$ alpha-olefin with propylene, with butene and octene being preferred and propylene most preferred. The diene component may be selected from the group consisting of $C_4$ to $C_{20}$ dienes.

In one embodiment, one or more elastomers may be a natural rubber. Desirable embodiments of natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) in the range of 30 to 120, or in the range of 40 to 80.

The elastomers useful in this invention can be blended with various other rubbers or plastics, in particular thermoplastic resins such as nylons or polyolefins such as polypropylene or copolymers of polypropylene. These compositions are useful in air barriers such as bladders, tire innertubes, tire innerliners, air sleeves (such as in air shocks), diaphragms, as well as other applications where high air or oxygen retention is desirable.

In a preferred embodiment the elastomer is selected from poly(isobutylene-co-alkylstyrene), preferably poly(isobutylene-co-p-methylstyrene), halogenated poly(isobutylene-co-alkylstyrene), preferably halogenated poly(isobutylene-co-p-methylstyrene), star branched butyl rubber, halogenated star-branched butyl rubber, butyl rubber, halogenated butyl rubber, and mixtures thereof. In another preferred embodiment the elastomer comprises bromobutyl rubber or chlorobutyl rubber.

Hydrocarbon Polymer Additive

The elastomeric composition may further comprise a hydrocarbon polymer additive ("HPA"). HPAs are generally derived from petroleum streams, and may be hydrogenated or non-hydrogenated resins. Useful HPAs include, but are not limited to, aliphatic HPAs, aromatic modified aliphatic HPAs, aliphatic/aromatic resins, polycyclic resins, hydrogenated polycyclic resins, hydrogenated polycyclic aromatic resins, hydrogenated aromatic resins in which a substantial portion of the benzene rings are converted to cyclohexane rings, gum rosins, gum rosin esters, wood rosins, wood rosin esters, tall oil rosins, tall oil rosin esters, polyterpenes, aromatic modified polyterpenes, terpene phenolics, and combinations thereof.

The HPA may be used as an elastomer compounding material. Depending on how the HPA is compounded, optimization of rubber characteristics for rubber and tire durability, traction, and abrasion resistance can be achieved. For example, naphthenic oil is normally added to a tire innerliner compound formulation to ensure adequate processing qualities of the compound in a tire production factory. However, naphthenic oil has a detrimental effect by increasing innerliner permeability. Use of HPAs in place of naphthenic oil may allow for maintenance of compound processing characteristics such as Mooney viscosity while simultaneously improving innerliner impermeability. Replacement of naphthenic process oil with HPA may allow maintenance of innerliner compound factory processing qualities and thus enable improvements in other properties such as, but not limited to, fatigue resistance, durability, and/or impermeability.

The properties (molecular weight, molecular weight distribution, glass transition temperature, branching, etc.) of the HPA may be manipulated by varying the feedstock from which the HPA is derived. The HPA may be produced from a variety of feedstocks; for example, in some embodiments a major component of the feedstock may be piperylene, while in other embodiments cyclopentadiene may be a main component, and in further embodiments, distillates containing vinyltoluenes and indene may be the main components.

The properties of the HPA are also affected by the microstructure of the resin, i.e., the type and amount of monomer components. Monomer placement in the resin chain is random leading to further complexity in the polymer microstructure. For example, some resins may contain aliphatic hydrocarbon components which have a hydrocarbon chain formed from $C_4$-$C_6$ fractions containing variable quantities of piperylene, isoprene, mono-olefins, and non-polymerizable paraffinic compounds. Such HPAs may be based on pentene, butane, isoprene, piperylene, and generally contain reduced quantities of cyclopentadiene and dicyclopentadiene. The HPA may also contain aromatic hydrocarbon structures having polymeric chains which are formed of aromatic units, such as styrene, xylene, α-methylstyrene, vinyl toluene, and indene. Other HPAs may comprise primarily cyclopentadiene and/or dicyclopentadiene.

The HPA may contain "aliphatic" and/or "aromatic" components. Preferred aliphatic olefins are $C_4$ to $C_{20}$, preferably $C_4$ to $C_7$, even more preferably $C_5$ to $C_6$, linear, branched, or alicyclic olefins or non-conjugated diolefins. Preferred aromatic olefins include one or more of styrene, indene, derivatives of styrene and derivatives of indene. Particularly preferred aromatic olefins include styrene, alpha-methylstyrene, beta-methylstyrene, indene and methylindenes, and vinyl tolunes. In preferred embodiments, the HPA comprises monomers derived from piperylene, isoprene, amylene, cyclics, styrene, indene, or combinations thereof.

Piperylenes are generally a distillate cut or synthetic mixture of $C_5$ diolefins, which include, but are not limited to, cis-1,3-pentadiene, trans-1,3-pentadiene, and mixed 1,3-pentadiene. In general, piperylenes do not include branched $C_5$ diolefins such as isoprene.

Cyclics are generally a distillate cut or synthetic mixture of $C_5$ and $C_6$ cyclic olefins, diolefins, and dimers therefrom. Cyclics include, but are not limited to, cyclopentene, cyclopentadiene ("CPD"), dicyclopentadiene ("DCPD"), cyclohexene, 1,3-cyclohexadiene, and 1,4-cyclohexadiene. The term dicyclopentadiene is defined to include both the endo and exo forms of DCPD. A preferred cyclic is cyclopentadiene. The cyclic may be substituted; preferred substituted cyclics include CPDs and DCPDs substituted with a C1 to C40 linear, branched, or cyclic alkyl group, preferably one or more methyl groups. Methylcyclopentadiene is a preferred substituted cyclopentadiene.

The HPA may include one or more styrenic components, such as styrene, derivatives of styrene, and substituted styrenes. In general, styrenic components do not include fused-rings, such as indene.

The HPA may include one or more indenic components, such as indene and derivatives of indene.

In some embodiments, styrenic components may tend to lower the HPA's softening point. Other aromatics (especially indenics) may tend to increase the HPA's softening point. In other embodiments, the HPA may include CPD and DCPD which tend to have a broadening effect on molecular weight distribution and tend to increase the HPA's softening point.

The HPA may be produced by methods generally known in the art for the production of hydrocarbon resins. For example, in some embodiments the HPA is produced by thermal polymerization, while in other embodiments the HPA may be produced by catalytic polymerization. The polymerization and stripping conditions may be adjusted according to the nature of the feed to obtain the desired resin.

In one embodiment, the HPA may be prepared by thermal polymerization. For example, the resin may be thermally polymerized from a feed containing cyclopentadiene in a benzene or toluene solvent for 2.0 to 4.0 hours at 220 C to 280° C. and about 14 bars pressure (1.4 MPa), with conditions being adjusted to control the molecular weight and softening point of the resin. The feed may further contain alkyl cyclopentadienes, dimers and codimers of cyclopentadiene and methylcyclopentadiene, and other acyclic dienes such as 1,3-piperylene and isoprene. Other copolymerizable unsaturated monomers such as vinyl aromatics such as styrene, a-methylstyrene, indene, and vinyl toluene may also be present.

In another embodiment, the HPA may be catalytically polymerized. A preferred method for production of the resins is combining the feed stream in a polymerization reactor with a Friedel-Crafts or Lewis Acid catalyst at a temperature in the range of 0° C. and 200° C., preferably in the range of 20° C. and 80° C. Friedel-Crafts polymerization is generally accomplished by use of known catalysts in a polymerization solvent, and removal of solvent and catalyst by washing and distillation. The polymerization process may be in a batchwise or continuous mode, continuous polymerization may be in a single stage or in multiple stages. The Friedel-Crafts catalysts that may be used include, but are not limited to, Lewis Acids such as boron triflouride (BF3), complexes of boron triflouride, aluminum trichloride (AlCl3), or alkyl-aluminum halides, particularly chloride. In an embodiment, the amount of Lewis Acid that may be used in the catalyst is in the range of 0.3 to 3.0 wt %, based upon the weight of the feed blend, preferably 0.5 to 1.0 wt %. The aluminum trichloride catalyst is preferably used as a powder.

In a preferred embodiment the resins may be hydrogenated. Any known process for catalytically hydrogenating resins may be used to hydrogenate the resin. The hydrogenation of hydrocarbon resins may be carried out via molten or solution based processes by either a batchwise or, more commonly, a continuous process. Catalysts employed for the hydrogenation of HPAs are typically supported monometallic and bimetallic catalyst systems. The catalysts which may be used may include Group VIII metals such as nickel, palladium, ruthenium, rhodium, cobalt, and platinum, Group VI metals such as tungsten, chromium, and molybdenum, Group VII metals such as rhenium, manganese, and copper, other catalysts may be based on group 9, 10, or 11 elements. These metals may be used singularly or in combination of two or more metals, in the metallic form or in an activated form and may be used directly or carried on a solid support such as alumina or silica-alumina. The support material typically comprises porous inorganic refractory oxides such as silica, magnesia, silica-magnesia, zirconia, silica-zirconia, titanic silica-titania, alumina, silica-aluminum alumino-silicate, etc. Preferably, the supports are essentially free of crystalline molecular sieve materials. Mixtures of the foregoing oxides are also contemplated, especially when prepared as homogeneously as possible. Preferred supports include alumina, silica, carbon, MgO, TiO2, ZrO2, FeO3, or mixtures thereof.

The HPA may be polar or non-polar. "Non-polar" means that the HPA is substantially free of monomers having polar groups. Preferably the polar groups are not present, however if they are, preferably they are not present at more that 5 weight %, preferably not more that 2 weight %, even more preferably no more than 0.5 weight %.

Examples of commercially available HPAs include: OPPERRA™ 373, 394, 103 all available from ExxonMobil Chemical Company.

In one embodiment, the HPA has a melt viscosity in the range of 300 to 800 centipoise (cPs) at 160° C., or more preferably 350 to 650 cPs at 160° C. In a preferred embodiment, the HPA's melt viscosity is in the range of 375 to 615 cPs at 160° C., or in the range of 475 to 600 cPs at 160° C. The melt viscosity may be measured by a Brookfield viscometer with a type "J" spindle, ASTM D6267.

In other embodiments, the HPAs have a weight average molecular weight (Mw) greater than about 600 g/mole or greater than about 1000 g/mole. In at least one embodiment, HPAs have a weight average molecular weight (Mw) in the range of 1650 to 1950 g/mole, or 1700 to 1900 g/mole. Preferably HPA's have a weight average molecular weight in the range of 1725 to 1890 g/mole. The HPA may have a number average molecular weight (Mn) in the range of 450 to 700 g/mole, or 500 to 675 g/mole, or preferably in the range of 520 to 650 g/mole. The HPA may have a z-average molecular weight (Mz) in the range of 5850 to 8150 g/mole, or more preferably in the range of 6000 to 8000 g/mole. Mw, Mn, and Mz may be determined by gel permeation chromatography (GPC).

In one embodiment the HPA has a polydispersion index ("PDI", PDI=Mw/Mn) of 4 or less. In a preferred embodiment the HPA has a PDI in the range of 2.6 to 3.1.

In some embodiments, HPAs have a glass transition temperature (Tg) in the range of about −30° C. to about 100° C., or about 0° C. to about 80° C., or about 40° C. to 60° C., or about 45° C. to about 55° C., or preferably in the range of about 48° C. to about 53°C. Differential scanning calorimetry (DSC) may be used to determine the HPA's Tg. The procedure for Differential Scanning Calorimetry ("DSC") is described as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter ("DSC") (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. The total energy absorbed or released by the sample during the testing procedure is the ΔH, which is expressed as Joules per gram of polymer. The melting point is recorded as the temperature of the greatest heat absorption with respect to a baseline within the range of the melting of the sample.

In one or more embodiments, HPAs have a Mn of at least 400, a Mw of at least 500, a Z average molecular weight (Mz) of at least 700, and a polydispersity (Mw/Mn) of at least 1.5, where Mn, Mw, and Mz are determined by Gel Permeation Chromatography. Similarly, the resin has a Mn up to 2000, a Mw of up to 3500, a Mz of up to 15,000, and a polydispersity (Mw/Mn) up to 4.

In one embodiment the resin has a ring and ball softening point in the range of 10° C. to 140° C., preferably 80° C. to 120° C., as measured by ASTM E28-99. In another embodiment, the resin has a weight average molecular weight (Mw) of 4000 or less, preferably in the range of 500 and 4000, preferably in the range of 500 to 2500. In another embodiment, the resin has a Mw/Mn of 3 or less, preferably in the range of 1 and 2.4, or in the range of 1 and 2.

The HPA may contain varying amounts of one or more of piperylene, cyclics, isoprene, amylene, indenic components, and/or styrenic components.

In one embodiment, the HPA comprises 40 to 90 wt % piperylene, or from 50 to 90 wt %, or more preferably from 60 to 90 wt %. In another embodiment, the HPA comprises from 70 to 90 wt % piperylene.

In some embodiments, the HPA is substantially free of isoprene. In other embodiments, the HPA contains up to 5 wt % isoprene, or more preferably up to 10 wt % isoprene. In yet another embodiment, the HPA contains up to 15 wt % isoprene.

In some embodiments, the HPA is substantially free of amylene. In other embodiments, the HPA contains up to 10 wt % amylene, or up to 25 wt % amylene, or up to 30 wt % amylene. In yet another embodiment, the HPA contains up to 40 wt % amylene.

In some embodiments, aromatic olefins are typically present in the HPA from 5 to 45 wt %, or more preferably from 5 to 30 wt %. In preferred embodiments, the HPA comprises from 10 to 20 wt % aromatic olefins.

In one embodiment, the HPA comprises up to 60 wt % styrenic components or up to 50 wt % styrenic components. In one embodiment, the HPA comprises from 5 to 30 wt % styrenic components, or from 5 to 20 wt % styrenic components. In a preferred embodiment, the HPA comprises from 10 to 15 wt % styrenic components.

In another embodiment, the HPA may include up to 15 wt % indenic components, or up to 10 wt % indenic components. Indenic components include indene and derivatives of indene. In one embodiment, the HPA comprises up to 5 wt % indenic components. In another embodiment, the HPA is substantially free of indenic components.

In one embodiment the HPA may include up to 60 wt % cyclics or up to 50 wt % cyclics. In some embodiments, the HPA includes cyclics in an amount in the range of about 0.1 wt % to about 50 wt %, or about 0.5 wt % to about 30 wt % cyclics, or about 1.0 wt % to about 20 wt % cyclics are included. In other embodiments, the HPA comprises from about 5 wt % to about 15 wt % cyclics.

In other preferred embodiments, the HPA may comprise greater than 75 wt % of cyclics, or greater than 80 wt %, or greater than 90 wt % cyclics. In some embodiments, the HPA may consist essentially of cyclics.

In another embodiment, the HPA contains dicyclopentadiene ("DCPD") and methyl substituted DCPD isomers which are polymerized thermally and then hydrogenated to remove any unsaturated double bonds. The HPA has a compact and rigid "ladder like" structure with some carbon-carbon branches. The HPA has a softening point of about 120° C. and a Tg of about 70° C.

In a particularly preferred embodiment, the HPA comprises dicyclopentadiene or substituted dicyclopentadiene. The preferred HPA has a Mn of about 410, a Mw of about 630, and a Mz of about 1020. The resin may have a softening point in the range of about 115 to about 130° C., as measured by ASTM E28-99.

In one embodiment, the HPA may comprise 50-90 wt % piperylene, 0-5 wt % isoprene, 10-30 wt % amylene, 0-5 wt % cyclics, 0-10 wt % styrenic components, and 0-10 wt % indenic components. The resin may have a melt viscosity at 160° C. of from 375 cPs to 515 cPs, a Mn of 700-900 g/mole, a Mw of 1400-1800 g/mole, a Mz of 3000-5000 g/mole, and a Tg of 45° C. to 50° C.

In another embodiment, the HPA may comprise 60-90 wt % piperylene, 0-5 wt % isoprene, 0-10 wt % amylene, 5-15 wt % cyclics, 5-20 wt % styrenic components, and 0-5 wt % indenic components. The resin may have a melt viscosity at 160° C. of from 375 cPs to 615 cPs, a Mn of 520-650 g/mole, a Mw of 1725-1890 g/mole, a Mz of 6000-8200 g/mole, and a Tg of 48° C. to 53° C.

In yet another embodiment, the HPA may comprise dicyclopentadiene and methyl substituted dicyclopentadiene. The resin may have a softening point of from 110 to 150° C., or in the range of about 115 to 130° C. as measured by ASTM E28-99. The resin may have a Tg in the range of 60 to 80° C., or in the range of 65 to 75° C., or in the range of 67 to 73° C. The resin may have a Mn of in the range of 350 to 450 g/mole, or in the range of 370 to 430 g/mole, or in the range of 390 to 420 g/mole, or in the range of 400 to 415 g/mole. The resin may have a Mw in the range of 500 to 700 g/mole, or in the range of 550 to 675 g/mole, or in the range of 600 to 650 g/mole. The resin may have a Mz in the range of 950 to 110 g/mole, or in the range of 980 to 1050 g/mole, or in the range of 1000 to 1030 g/mole.

In a further embodiment, the HPA may consist essentially of cyclics, such as dicyclopentadiene and substituted dicyclopentadiene. The resin may have a softening point in the range of about 115 to 130° C. as measured by ASTM E28-99, a Tg of about 70° C., a Mn of about 410 g/mole, a Mw of about 630 g/mole, and a Mz of about 1020 g/mole.

Nanocomposites

Nanocomposites are polymer systems containing inorganic particles with at least one dimension in the nanometer range. A common type of inorganic particle used in nanocomposites are phyllosilicates, an inorganic substance from the general class of so called "nano-clays" or "clays." Due to general enhancement in air barrier qualities of various elastomeric compositions when a nanocomposite is present, there is a desire to have an elastomeric composition comprising a nanocomposite comprising elastomer and clay.

The inorganic particles (e.g., clays) can act as plate-like barriers to the transmission of oxygen through the elastomeric composition. However, in order to be effective the inorganic particles need to be fully dispersed throughout the elastomeric composition. This can be difficult, as it generally requires the dispersment of polar clay in a generally non-polar rubber.

Ideally, intercalation should take place in the nanocomposite, wherein the polymer inserts into the space or gallery between the clay surfaces. Ultimately, it is desirable to have near complete exfoliation, wherein the polymer is fully dispersed or intercalated with the individual nanometer-size clay platelets.

Suitable inorganic particles useful in nanocomposites can include swellable inorganic clay materials, such as natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at an interlayer spacing of 4 Å or less, and contain exchangeable cations such as $Na^+$, $Ca^{+2}$, $K^+$, or $Mg^{+2}$ present at the interlayer surfaces.

In some embodiments, the clay can be mixed with an organic liquid to form a clay dispersion. The clay can be inorganic clay or an organically modified clay; the organic liquid can be miscible or immiscible in water. In certain embodiments, the dispersion can have a clay concentration in the range of 0.1 to 5.0 wt %, or in the range of 0.1 to 3.0 wt %.

The layered clay may also be intercalated and exfoliated by treatment with organic molecules, typically known as swelling or exfoliating agents or additives. The swelling/exfoliating agents are capable of undergoing ion exchange reactions with the cations present at the interlayer surfaces of the layered clay. For example, an intercalated/exfoliated clay may be produced through solution based ion-exchange reactions that replace sodium ions that exist on the surface of the sodium montmorillonite clay with organic molecules (swelling/exfoliating agents) such as alkyl or aryl ammonium compounds.

Suitable exfoliating agents include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^1R^2R^3N$, wherein $R^1$, $R^2$, and $R^3$ are $C_1$ to $C_{30}$ alkyls in one embodiment or $C_2$ to $C_{30}$ alkyls or alkenes in another embodiment, which may be the same or different. In one embodiment, the exfoliating agent is a so called long chain tertiary amine, wherein at least $R^1$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^4R^5N-R^6-NR^7R^8$, wherein $R^4$, $R^5$, $R^6$, $R^7$, and $R^8$ are the same or different $C_1$ to $C_{30}$ alkyls, or $C_2$ to $C_{30}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, and N,N,N'-trimethyl-N'-tallow-1,3-diaminopropane.

Another class of exfoliating agents includes those which can be covalently bonded to the interlayer surfaces. These include polysilanes of the structure $-Si(R^{15})_2R^{16}$ where $R^{15}$ is the same or different at each occurrence and is selected from alkyl, alkoxy or oxysilane and $R^{16}$ is an organic radical compatible with the matrix polymer of the composite.

Other suitable exfoliating agents include protonated amino acids and salts thereof containing 2-30 carbon atoms such as 12-aminododecanoic acid, epsilon-caprolactam and like materials. Suitable swelling agents and processes for intercalating layered clay silicates are also disclosed in U.S. Pat. Nos. 4,472,538, 4,810,734, and 4,889,885, all of which are incorporated herein by reference.

In a preferred embodiment, the exfoliating agent(s) are capable of reaction with the halogen sites on the interpolymer to form complexes which help exfoliate the clay. In one embodiment, the agent includes all primary, secondary, and tertiary amines and phosphines; alkyl and aryl sulfides and thiols; and their polyfunctional versions. Desirable agents include: long-chain tertiary amines such as N,N-dimethyloctadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In one embodiment the exfoliating agent may be present in the range of 0.1 to 20 phr or in the range of 0.2 to 15 phr, or in the range of 0.3 to 10 phr in another embodiment. The exfoliating agent may be added to the composition at any stage; for example, the agent may be added to the interpolymer, followed by addition of the clay, or may be added to the interpolymer and clay mixture; or the additive may be first blended with the clay, followed by blending with the interpolymer in yet another embodiment.

In another embodiment, improved impermeability is achieved by the presence of at least one polyfunctional curative. An embodiment of such polyfunctional curatives can be described by the formula $Z-R^{17}-Z'$, wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. The polyfunctional curative, if present, may be present in the composition in the range of 0.1 to 8 phr or in the range of 0.2 to 5 phr in another embodiment.

The elastomeric composition may also include reversion resistors. Non-limiting examples of such reversion resistors include bis-thiosulfate compounds, such as hexamethylene bis(sodium thiosulfate). Other reversion resistors are well known in the rubber compounding arts, such as hexamethylene bis(cinnamaldehyde).

Treatment with the swelling agents results in intercalation or "exfoliation" of the layered clay platelets as a consequence of a reduction of the ionic forces holding the layers of clay platelets together and introduction of molecules between layers which serve to space the layers at distances of greater than 4 Å, preferably greater than 9 Å. This separation allows the layered clay silicate to more readily absorb polymerizable monomer material and polymeric material between the layers and facilitates further delamination of the layers when the intercalate is shear mixed with matrix polymer material to provide a uniform dispersion of the exfoliated clay layers within the polymer matrix.

The amount of clay or exfoliated clay incorporated in the elastomeric composition is sufficient to develop an improvement in the mechanical properties or barrier properties of the composition by the formation of a nanocomposite. Amounts of clay in the elastomeric composition generally will be in the range of 0.5 to 10 wt % or in the range of 1 to 8 wt %, or in the range of 1 to 5 wt % in another embodiment, based on the polymer content of the composition. Expressed in parts per hundred parts of rubber, the clay or exfoliated clay may be present in the range of 1 to 30 phr or in the range of 2 to 20 phr.

Elastomer—clay nanocomposites can be formed using a variety of processes known in the art, such as solution blending, melt blending, or an emulsion process. For example, US Patent Application Publication 2007/015853, incorporated herein by reference, discloses a method for preparing clay-butyl rubber nanocomposites from an emulsion of rubber solution and aqueous clay dispersion in which the clay can be an inorganic clay. As another example of nanocomposite processing, U.S. application Ser. No. 11/183,361, incorporated herein by reference, discloses a method for preparing clay-butyl rubber nanocomposites by preparing a concentrated nanocomposite from a slipstream of the rubber and blending the concentrate with a main rubber stream.

In one embodiment, the elastomeric composition may contain a nanocomposite formed by a polymer melt blending process. For example, the elastomer and clay components may be blended to form an intercalate in any suitable mixing device such as a Banbury™ mixer, Brabender™ mixer, or preferably a mixer/extruder and mixing at temperatures in the range of 120° C. up to 300° C., under conditions of shear sufficient to allow the clay to intercalate and to exfoliate and become uniformly dispersed within the polymer to form the nanocomposite.

In another embodiment, a nanocomposite may be formed by an emulsion process. For example, the emulsions may be formed by conventional emulsion technology, that is, subjecting a mixture of the hydrocarbon, water, and surfactant, when used, to sufficient shearing, as in a commercial blender or its equivalent for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the clay, for example, from 0.1 to 100 hours or more in one embodiment, or from 1 to 50 hours, or from 2 to 20 hours in another embodiment.

Useful cationic surfactants include tertiary amines, diamines, polyamines, amine salts, as well as quaternary ammonium compounds. Useful non-ionic surfactants include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates. The surfactant concentration is generally that which will allow the formation of a relatively stable emulsion; in preferred embodiments, the amount of surfactant employed is at least 0.001 wt % of the total emulsion, more preferably in the range of 0.001 to about 3 wt %, and most preferably in the range of 0.01 to 2 wt %.

In other embodiments, the nanocomposite may be formed by solution blending. For example, the nanocomposite may be produced by contacting Solution A comprising a solvent comprising a hydrocarbon and at least one layered filler or clay with Solution B comprising a solvent and at least one elastomer, and removing the solvents from the contact product of Solution A and Solution B to form a nanocomposite. The layered clay may be treated with a swelling/exfoliating agent. In yet another embodiment, a nanocomposite is produced by a process comprising contacting at least one elastomer and at least one layered filler in at least one or more solvents; and removing the solvent(s) from the product to form a nanocomposite. In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In solution blending processes, the solvents may be present in the range of 30 to 99 wt %, alternatively 40 to 99 wt %, alternatively 60 to 99 wt %, alternatively 80 to 99 wt %, alternatively in the range of 90 to 99 wt %, alternatively from 95 to 99 wt %, based upon the total weight of the composition.

Fillers and Additives

The elastomeric compositions may also contain other components and additives customarily used in rubber compounds, such as, for example, effective amounts of other processing aids, pigments, accelerators, cross-linking and curing materials, antioxidants, antiozonants, and/or fillers. In addition to a HPA the elastomeric compositions may optionally include other useful processing aids such as, for example, plastomers, polybutenes, or mixtures thereof.

The elastomeric compositions may optionally comprise at least one filler, for example, calcium carbonate, titanium dioxide, aluminum oxide, zinc oxide, starch, wood flour, carbon black, mica, silica, talc, or mixtures thereof. The fillers may be any size and typically range, for example in the tire industry, from about 0.0001 μm to about 100 μm.

In some embodiments, the elastomeric composition may include nano-sized talcs. Nano-sized talcs have a very high surface area in comparison to conventional sized talc platelets. Nano-sized talcs typically have a maximum dimension in the 100 to 200 nm range.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

In one embodiment, one or more silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gammamercaptopropyltrimethoxysilane, and the like, and mixtures thereof.

The filler may be carbon black or modified carbon black. The filler may also be a blend of carbon black and silica. In one embodiment, the elastomeric composition comprises reinforcing grade carbon black at a level in the range of 10 to 100 phr of the blend, more preferably in the range of 30 to 80 phr in another embodiment, and in yet another embodiment in the range of 50 to 80 phr. Useful grades of carbon black include the ranges of from N110 to N990, preferably N660.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to rubber as is commonly understood in the industry.

Generally, polymer blends are crosslinked to improve the polymer's mechanical properties. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature in the range of about 100° C. to about 250° C. in one embodiment, or in the range of 150° C. to 190° C. in another embodiment, for about 1 to 150 minutes.

Halogen-containing elastomers may be crosslinked by their reaction with metal oxides. The metal oxide can be used alone or in conjunction with its corresponding metal fatty acid complex (e.g., zinc stearate), or with the organic and fatty acids added alone, such as stearic acid, and optionally other curatives such as sulfur or a sulfur compound, an alkylperoxide compound, diamines or derivatives thereof Sulfur is the most common chemical vulcanizing agent for diene-containing elastomers. It exists as a rhombic 8-member ring or in amorphous polymeric forms. The sulfur vulcanization system may consist of an activator to activate the sulfur, an accelerator, and a retarder to help control the rate of vulcanization. Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-tertiarybutyl-2-benzothiazole sulfenamide (TBBS), N-cyclohexyl-2-benzothiazole-sulfenamide (CBS), and thioureas.

In one embodiment, at least one curing agent(s) is present in the range of 0.2 to 10 phr, or 0.5 to 5 phr, or in another embodiment in the range of 0.75 phr to 2 phr.

Processing

The elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In other embodiments, additional stages may involve incremental additions of one or more fillers.

In another embodiment, mixing of the components may be carried out by combining the elastomer components, filler and clay in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow the clay to exfoliate and become uniformly dispersed within the elastomer(s) to form the nanocomposite.

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, is typically added to the mixer, and mixing continues until the temperature reaches from 90° C. to 150° C. Next, the remaining filler is added, as well as the processing aids, and mixing continues until the temperature reaches from 130° C. to 190° C., depending on the polymers being used. The masterbatch mixture is then finished by sheeting on an open mill and allowed to cool, for example, to from 60° C. to 100° C. when curatives may be added.

Mixing with the clays is performed by techniques known to those skilled in the art, wherein the clay is added to the polymer at the same time as the carbon black in one embodiment. The HPA processing aid is typically added later in the mixing cycle after the carbon black and clay have achieved adequate dispersion in the elastomeric matrix.

The cured compositions can include various elastomers and fillers with the HPA processing aid. The elastomeric compositions typically include $C_4$ to $C_7$ monoolefin elastomers, such as isobutylene-based elastomers, or preferably halogenated poly(isobutylene-co-p-methylstyrene), with HPA(s) being present in the range of 5 to 50 phr in one embodiment, or 10 to 40 phr, or in the range of 10 to 30 phr in another embodiment.

The isobutylene-based elastomer useful in the invention can be blended with various other rubbers or plastics as disclosed herein, in particular thermoplastic resins such as nylons or polyolefins such as polypropylene or copolymers of polypropylene. These compositions are useful in air barriers such as bladders, tire innertubes, tire innerliners, air sleeves (such as in air shocks), diaphragms, as well as other applications where high air or oxygen retention is desirable. In one embodiment, the cured composition has a permeation coefficient at 40° C. of 220 cc*mm/[$m^2$-day] or less, or 200 cc*mm/[$m^2$-day] or less, 160 cc*mm/[$m^2$-day] or less, or 140 cc*mm/[$m^2$-day] or less, or 120 cc*mm/[$m^2$-day] or less, or 100 cc*mm/[$m^2$-day] or less. In preferred embodiments, the cured elastomeric composition has a permeation coefficient at 40° C. of 90 cc*mm/[$m^2$-day] or less, or 80 cc*mM/[$m^2$-day] or less, or 75 cc*mm/[$m^2$-day] or less, or 70 cc*mm/[$m^2$-day] or less.

In one embodiment, an air barrier can be made by the method of combining a random copolymer comprising a $C_4$ to $C_7$ isomonoolefin derived unit, at least one filler, at least one HPA, a clay, and at least one cure agent; and curing the combined components.

The elastomeric compositions as described above may be used in the manufacture of air membranes such as innerliners and innertubes used in the production of tires. Methods and equipment used to manufacture the innerliners and tires are well known in the art. The invention is not limited to any particular method of manufacture for articles such as innerliners or tires.

Industrial Applicability

The elastomeric compositions may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. Such tires can be built, shaped, molded, and cured by various methods which are known to those having skill in the art. The elastomeric compositions may either be fabricated into a finished article or a component of a finished article such as an innerliner for a tire. The article may be selected from air barriers, air membranes, films, layers (microlayers and/or multilayers), innerliners, innertubes, air sleeves, tire curing bladders, and the like.

The elastomeric compositions of the present invention may be useful in a variety of applications, particularly pneumatic tire components, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

The elastomeric compositions of this invention are particularly suitable for tire innerliners and innertubes and other materials requiring good air retention. A tire innerliner with improved impermeability can allow for maintenance of correct inflation pressure; reduction in tire rolling resistance thus reducing fuel consumption due to the better inflation pressure retention; longer tire life due to better tire tread footprints and more even-wear performance; and smoother steering response due to better inflation pressure retention.

EXAMPLES

The elastomeric compositions comprising an elastomer, a HPA, and a clay will now be further described with reference to the following non-limiting examples.

When possible, standard ASTM tests were used to determine the cured compound physical properties. Stress/strain properties (e.g., tensile strength, elongation at break, modulus values, energy to break) were measured according to ASTM D412 using "Die-C" at room temperature using an Instron 4202. Tensile strength measurements were made at ambient temperature; the specimens (dog-bone shaped) had a restricted width of 6 mm and a restricted length of 33 mm between two tabs. Though the thickness of the test specimen was a nominal 2.00 mm, the thickness of the specimens varied and was measured manually by a Mitutoyo Digimatic Indicator connected to the system computer. The specimens were pulled at a crosshead speed of 500 mm/min and the stress/strain data was recorded. The average stress/strain value of at least three specimens is reported. The error ($2\sigma$) in Tensile measurements is ±0.47 MPa. The error ($2\sigma$) in measuring 100% Modulus is ±0.11 MPa; the error ($2\sigma$) in measuring elongation is ±13%.

Cure properties were measured using an MDR 2000 from Alpha Technologies, Inc. at the indicated temperature and 0.5 degree arc, based on ASTM D 5289. The values "MH" and "ML" used herein refer to "maximum torque" and "minimum torque," respectively. The "MS" value is the Mooney scorch value, the "ML(1+8)" value is the Mooney viscosity value of the polymer, and the "ML(1+4)" value is the Mooney viscosity value of the composition. The error ($2\sigma$) in the Mooney viscosity measurement is ±0.65. The values of "Tc" are cure times in minutes, and "Ts" is scorch time in minutes.

Permeability was measured using a Mocon OxTran Model 2/61 oxygen transmission rate test apparatus. The oxygen transmission rate is measured under the principle of dynamic measurement of oxygen transport through a thin film. Compound samples are clamped into a diffusion cell. The samples are approximately 5.0 cm in diameter and about 0.5 mm thick. The cell is then purged of residual oxygen using a high purity nitrogen carrier gas. The nitrogen gas is routed to a sensor until a stable zero value is established. The measurement is typically conducted at 40° C. Pure oxygen air is then introduced into the outside of the chamber of the diffusion cell. The oxygen diffusing through the sample to the inside chamber is conveyed to a chamber which measures the oxygen diffusion rate. The oxygen diffusion rate is expressed as a transmission rate coefficient. The permeation coefficient is a measure of the transmission rate normalized for sample thickness (mm) and is expressed as a volume of gas (cc) per unit area of the sample ($m^2$) in a discrete unit of time (e.g., 24 hours), and has the units of $cc*mm/(m^2\text{-day})$. The permeability coefficient considers atmospheric pressure and is expressed as $cc*mm/(m^2\text{-day-mmHg})$.

Molecular weight of the hydrocarbon polymer additive was determined by gel permeation chromatography. The techniques for determining the molecular weight (Mn, Mw, and Mz) and molecular weight distribution (MWD) are generally described in U.S. Pat. No. 4,540,753, which is incorporated herein by reference. The polydispersion index (PDI) was calculated as Mw/Mn. The melt viscosity of the hydrocarbon polymer additives was determined using a Brookfield viscometer with a type "J" spindle, ASTM D-6267.

A listing of various test methods used is in Table 1. A listing of various components used in the examples is in Table 2.

TABLE 1

Test Methods

| Parameter | Units | Test |
|---|---|---|
| Mooney Viscosity (polymer) | | |
| ML 1 + 8, 125° C. | MU | ASTM D 1646 |
| Mooney Viscosity (composition) | | |
| ML 1 + 4, 100° C. | MU | ASTM D 1646 |
| Hardness | Shore A | ASTM D 2240 |
| Mooney Scorch Time | | |
| 125° C. for 60 min, 1 min preheat | | ASTM D 1646 |
| t5 | minutes | |
| Moving Die Rheometer (MDR) | | |
| 160° C. for 60 min, ±0.5° arc | | ASTM D 5289 |
| MH-ML | deciNewton.meter | |

TABLE 1-continued

Test Methods

| Parameter | Units | Test |
|---|---|---|
| Moving Die Rheometer (MDR) 180° C. for 30 min, ±0.5° arc | | ASTM D 5289 |
| MH-ML | deciNewton.meter | |
| Tensile Test | | |
| 300 Modulus | MPa | ASTM D 412 die C |
| Energy To Break | J | |
| Stress at Break | MPa | |
| % Strain at Break | % | |
| Die B Tear | | |
| Tear Resistance | N/mm | ASTM D 624 |
| Mocon Oxygen Permeability Test 40° C., 20% oxygen concentration | | |
| Permeation Coefficient | cc * mm(m²-day) | See text. |

TABLE 2

Various Components in the Elastomeric Compositions

| Component | Brief Description | Commercial Source |
|---|---|---|
| EXXPRO ™ MDX 03-1 | Brominated poly(isobutylene-co-p-methylstyrene), 0.85 ± 0.1 mol % benzylic Br; 10 ± 0.5 p-methylstryene, 27-37 Mooney Viscosity | ExxonMobil Chemical Co. (Houston, TX) |
| N660 | Carbon Black | |
| Cloisite Na⁺ | Clay | Southern Clay Products |
| STRUKTOL ™ 40 MS | Composition of aliphatic-aromatic-naphthenic resins. Tg = 50° C. | Strucktol Co. of America (Stow, OH) |
| Oppera ™ 103J | HPA comprising dicyclopentadiene and methyl-substituted dicyclopentadiene | ExxonMobil Chemical Co. (Houston, TX) |
| CALSOL ™ 810 | Naphthenic Oil ASTM Type 103 | R. E. Carroll, Inc. (Trenton, NJ) |
| SP-1068 | Brominated alkyl phenol-formaldehyde resin. Tg = 40° C. | Schenectady, Inc. (Schenectady, NY) |
| Triethyl Amine | | |
| Stearic Acid | Activator | ACI 5106NF, Witco Manufacturing |
| Zinc Oxide (Zn) | Activator | KADOX ™ 911, Zinc Corp. of America (Monaca, PA) |
| MBTS | Accelerator; 2-Mercaptobenzothiazole disulfide | R. T. Vanderbilt (Norwalk, CT) or Elastochem (Chardon, OH) |
| Sulfur | Curative | Rubbermakers Sulfur |

In the examples, model tire innerliner compounds were prepared using a Banbury mixer. The non-productive (first-stage) mixing cycle was conducted with a mixer rotor speed set at 70 rpm with a ram pressure of 60 psi, and a 70° C. chamber temperature. The elastomers, clay (compounds A2, B7, and B9 only), or clay/triethyl amine (TEA) paste (compounds A3-A7, B8, and C10 only), and HPA were added in the non-productive mixing cycle. In the compounds containing TEA, the TEA was added directly to the dry sodium clay before mixing to form a clay/TEA paste. The ram pressure was lowered, and after 120 seconds the remaining first-stage ingredients were added. The compound temperature was increased to 160° C. and the formulation was mixed for 300 seconds.

In the second-stage (productive) mixing cycle, the Banbury mixer was set for 30-40 rpm mixing speed, 50 psi ram pressure, and 60° C. chamber temperature. Half of the first-stage compound were mixed together with the second-stage ingredients, and then the remainder of the first-stage compound was added before lowering the ram. Then the compound was mixed for 90 seconds. The compounds were then sheeted on a 2-roll mill by adding the compound to the mill which was kept cool. The Banbury mixed compound drop temperatures for the non-productive and the productive stages were 160° C. and 105° C., respectively.

Example 1

The formulations for the model tire innerliner compounds of Example 1 are listed in Table 3, all amounts listed are in phr. Compound A1 represents the control formulation. In Compound A2, sodium clay was added to control formulation. Compounds A3, A4, and A5 contained clay/TEA paste in varying amounts. The compounds were tested for a range of processing, curing, and physical properties. The data is presented in Table 4.

TABLE 3

Model Tire Innerliner Formulation

| | A1 | A2 | A3 | A4 | A5 |
|---|---|---|---|---|---|
| Exxpro ™ MDX 03-1 | 100 | 100 | 100 | 100 | 100 |
| N660 | 60 | 60 | 60 | 60 | 60 |
| Cloisite Na⁺ | | 6 | 6 | 6 | 6 |
| Strucktol ™ 40MS | 7 | 7 | 7 | 7 | 7 |
| Calsol ™ 810 | 8 | 8 | 8 | 8 | 8 |
| SP-1068 | 4 | 4 | 4 | 4 | 4 |
| Triethyl Amine | | | 0.05 | 0.1 | 0.2 |
| Stearic Acid | 1 | 1 | 1 | 1 | 1 |
| ZnO | 1 | 1 | 1 | 1 | 1 |
| MBTS | 1.25 | 1.25 | 1.25 | 1.25 | 1.25 |
| Sulfur | 0.5 | 0.5 | 0.5 | 0.5 | 0.5 |

TABLE 4

Properties of the Model Tire Innerliner Compounds

| | A1 | A2 | A3 | A4 | A5 |
|---|---|---|---|---|---|
| Mooney Viscosity 8 min @ 125° C., with 1 min preheat, 1 min decay | | | | | |
| ML [MU] 1 + 8 | 58.2 | 58.5 | 60.7 | 61.9 | 67.1 |
| Mooney Scorch 60 min @ 125° C., 1 min preheat | | | | | |
| t5 [min] MDR × 10's | 25.7 | 24.3 | 18.3 | 17.8 | 3.8 |

TABLE 4-continued

Properties of the Model Tire Innerliner Compounds

|  |  | A1 | A2 | A3 | A4 | A5 |
|---|---|---|---|---|---|---|
| 60 min @ 160° C. | | | | | | |
| MH-ML | [dNm] | 5.0 | 4.8 | 4.6 | 4.5 | 4.3 |
| MDR × 10's 30 min @ 180° C. | | | | | | |
| MH-ML | [dNm] | 4.8 | 4.7 | 4.5 | 4.4 | 4.2 |
| Tensile 1000 Test | | | | | | |
| 300% Modulus | [MPa] | 4.4 | 4.4 | 4.4 | 4.6 | 5.7 |
| Energy to Break | [J] | 8.8 | 10.2 | 11.0 | 10.0 | 10.8 |
| Stress at Break | [MPa] | 8.6 | 8.9 | 9.1 | 9.1 | 10.5 |
| % Strain at Break | [%] | 727.0 | 780.2 | 803.4 | 765.9 | 695.0 |
| Hardness | | | | | | |
| Shore A Die B Tear | | 49.4 | 51.5 | 49.3 | 48.6 | 49.6 |
| Tear Resistance | [N/mm] | 53.639 | 52.148 | 53.617 | 52.546 | 53.992 |
| Mocon Oxygen Permeability 40° C., 20% oxygen concentration | | | | | | |
| Permeation Coefficient [cc * mm/(m²-day)] (Average Value Reported) | | 150 | 140 | 139 | 161 | 160 |

Addition of sodium clay in Compound A2 to the control formulation of Compound A1 improved the compound's impermeability while having little to no impact on the other compound properties tested. It is believed that only minimal changes were seen in compound properties due to poor distribution and dispersion of the ionic sodium clay in the non-polar elastomeric polymer. It is further believed that a bigger impact in the compound properties due to the inclusion of the clay may be seen when the clay is more fully distributed and dispersed within the elastomer.

At low TEA levels (Compound A3, 0.05 phr TEA), the compound's impermeability was similar to that of the compound containing the sodium clay (Compound A2). However, at higher loading levels of TEA (Compounds A4 and A5), the compounds' impermeability was worse (i.e., Compounds A4 and A5 were more permeable) than that of the control formulation (Compound A1).

Addition of TEA in Compounds A3, A4, and A5 did impact some of the compound properties. Furthermore, the magnitude of the impact corresponded to the level of TEA content. The Mooney viscosity was higher in the compounds with higher levels of TEA loading. It is believed that the increase in Mooney viscosity with increased TEA loading was due to an increase in the number of ammonium sites on the elastomeric polymer.

Additionally, the presence of TEA, especially at the higher loading levels, significantly decreased the Mooney Scorch values. This suggests that the TEA may cause an undesirable premature cure of the compound.

Example 2

In Example 2, the naphthenic processing oil (i.e., Calsol™ 810) of the control formulation (Compound A1) was replaced with HPA. In Compound B1, 25 phr of the HPA was used to replace the 8 phr of the processing oil. In Compound B2 sodium clay was also added, and in Compound B3 a sodium clay/TEA paste was added to the compound. The formulations for the compounds are listed in Table 5, all amounts listed are in phr. The compounds were tested for a range properties with the resulting data presented in Table 6.

TABLE 5

Model Tire Innerliner Compounds Containing HPA

|  | A1 | B1 | B2 | B3 |
|---|---|---|---|---|
| Exxpro ™ MDX 03-1 | 100 | 100 | 100 | 100 |
| N660 | 60 | 60 | 60 | 60 |
| Cloisite Na | | | 6 | 6 |
| Strucktol 40MS | 7 | 7 | 7 | 7 |
| Oppera ™ 103J | | 25 | 25 | 25 |
| Calsol ™ 810 | 8 | 0 | 0 | 0 |
| SP-1068 | 4 | 4 | 4 | 4 |
| Triethyl Amine | | | | 0.1 |
| Stearic Acid | 1 | 1 | 1 | 1 |
| ZnO | 1 | 1 | 1 | 1 |
| MBTS | 1.25 | 1.25 | 1.25 | 1.25 |
| Sulfur | 0.5 | 0.5 | 0.5 | 0.5 |

TABLE 6

Properties of the Model Tire Innerliner Compounds Containing HPA

|  |  | A1 | B1 | B2 | B3 |
|---|---|---|---|---|---|
| Hardness | | | | | |
| [Shore A] | | 49.4 | 47.6 | 48.1 | 50 |
| Mooney Viscosity 8 min @ 125° C., with 1 min preheat, 1 min decay | | | | | |
| ML1 + 8 | [MU] | 58.2 | 50.5 | 51.9 | 54.5 |
| Mooney Scorch 60 min @ 125° C., 1 min preheat | | | | | |
| t5 | [min] | 25.4 | 33.5 | 34.9 | 9.5 |
| MDR × 10's 60 min @ 160° C. | | | | | |
| MH-ML | [dNm] | 5.0 | 3.2 | 3.2 | 3.0 |
| MDR × 10's 30 min @ 180° C. | | | | | |
| MH-ML | [dNm] | 4.8 | 3.2 | 3.1 | 2.9 |
| Tensile 1000 Test | | | | | |
| 300% Modulus | [MPa] | 4.4 | 4.5 | 4.6 | 5.2 |
| Energy to Break | [J] | 8.8 | 11.3 | 10.9 | 13.8 |

TABLE 6-continued

Properties of the Model Tire Innerliner Compounds Containing HPA

|  |  | A1 | B1 | B2 | B3 |
|---|---|---|---|---|---|
| Stress at Break | [MPa] | 8.6 | 12.0 | 10.9 | 12.3 |
| % Strain at Break | [%] | 727.0 | 785.0 | 760.7 | 783.5 |
| Die B Tear |  |  |  |  |  |
| Tear Resistance | [N/mm] | 53.6 | 55.3 | 51.7 | 53.1 |
| Mocon Oxygen Permeability Test 40° C., 20% oxygen concentration |  |  |  |  |  |
| Permeation Coefficient [cc * mm/(m$^2$-day)] (Avg. of 9 Specimens Reported) |  | 150 | 87 | 67 | 70 |

Replacing the naphthenic process oil with the HPA had little impact on the hardness, tensile, and tear properties of the model tire innerliner. The MDR of the compounds in Example 2 were lower than those of Example 1, which may indicate that the cure rate was slower. However, the cure rate could be adjusted by modifying the cure package, such as by using a different accelerator.

The Mooney viscosity of the compounds containing the HPA was lower than that of the model compounds in Example 1. However, the Mooney viscosity is still within the desirable window for proccessability, which is 50-60 MU. Additionally, the Mooney scorch values of the compounds in Example 2 are slightly higher, suggesting that the compounds containing the HPA may have better cure stability.

Replacing the naphthenic process oil with the HPA greatly reduced the permeability of the compound. A comparison of Compound A1, having a permeation coefficient of 150 cc*mm/(m$^2$-day), to Compound B1, having a permeation coefficient of 87 cc*mm/(m$^2$-day), demonstrates that a 42% improvement in compound permeability was obtained when the naphthenic processing oil was replaced with the HPA. Furthermore, the addition of sodium clay in Compound B2 improved the compounds impermeability by reducing the permeation coefficient from 87 cc*mm/(m$^2$-day) (Compound B1) to 67 cc*mm/(m$^2$-day) (Compound B2). This further reflects a 55% improvement in impermeability as compared to Compound A1.

Replacing the naphthenic processing oil with the HPA resulted in a compound with a 40-50% improvement in permeability, while maintaining similar, if not better, mechanical and physical properties to the formulation of Compound A1. Further addition of sodium clay to the innerliner formulations containing the HPA resulted in even further impermeability improvements, while maintaining acceptable mechanical and physical properties of the compound.

Example 3

In Example 3, the model tire innerliner compound formulations of Example 1 were tested where the naphthenic processing oil (i.e., Calsol 810) and the phenolic tackifying resin (i.e., SP 1068) were replaced with HPA. The tire compound formulations used in Example 3 are listed in Table 7, all amounts listed are in phr. Compound A1 from Example 1 represents a typical tire innerliner compound formulation. In Compound C1 29 phr of HPA was used to replace the 12 phr of processing oil and phenolic resin in Compound A-1. Compound C2 is the same as Compound C1 but also includes 0.1 phr of TEA. The compounds were tested for a range of processing, curing, and physical properties, with the resulting data presented in Table 8.

TABLE 7

Tire Innerliner Formulations Containing HPA

|  | A1 | C1 | C2 |
|---|---|---|---|
| Exxpro ™ MDX 03-1 | 100 | 100 | 100 |
| N660 | 60 | 60 | 60 |
| Calsol ™ 810 | 8 | 0 | 0 |
| Strucktol ™ 40MS | 7 | 7 | 7 |
| SP-1068 | 4 | 0 | 0 |
| Cloisite Na$^+$ |  |  | 6 |
| Triethyl Amine |  |  | 0.1 |
| Oppera ™ 103J |  | 29 | 29 |
| Stearic Acid |  | 1 | 1 |
| ZnO | 1 | 1 | 1 |
| MBTS | 1.25 | 1.25 | 1.25 |
| Sulfur | 0.5 | 0.5 | 0.5 |

TABLE 8

Properties of the Tire Innerliner Compounds Containing HPA

|  |  | A1 | C1 | C2 |
|---|---|---|---|---|
| Hardness |  |  |  |  |
| [Shore A] |  | 49.4 | 47.9 | 48.9 |
| Mooney Viscosity 8 min @ 125° C., with 1 min preheat, 1 min decay |  |  |  |  |
| ML 1 + 8 | [MU] | 58.2 | 51.0 | 49.0 |
| MDR x 10's 60 min @ 160° C. |  |  |  |  |
| MH-ML | [dNm] | 5.0 | 3.2 | 3.2 |
| MDR x 10's 30 min @ 180° C. |  |  |  |  |
| MH-ML | [dNm] | 4.8 | 3.2 | 3.3 |
| Tensile 1000 Test |  |  |  |  |
| 300% Modulus | [MPa] | 4.4 | 4.4 | 4.4 |
| Energy to Break | [J] | 8.8 | 11.2 | 11.7 |
| Stress at Break | [MPa] | 8.6 | 11.3 | 11.6 |
| % Strain at Break | [%] | 726.0 | 792.4 | 788.6 |
| Die B Tear |  |  |  |  |
| Tear Resistance | [N/mm] | 53.6 | 53.0 | 50.3 |
| Mocon Oxygen Permeability Test 40° C., 20% oxygen concentration |  |  |  |  |
| Permeation Coefficient [cc * mm/(m$^2$-day)] (Avg. of 3 Specimens Reported) |  | 150 | 72 | 83 |

Replacing the naphthenic processing oil and the phenolic tackifying resin with HPA yielded a compound with properties similar to the reference Compound A1 and similar to those found when replacing only the processing oil in Example 2. The compound mechanical properties, such as tensile strength and hardness, of Compounds A1, C1, and C2 were all within desired manufacturing targets for a tire innerliner compound. Typical properties for a tire innerliner compound include a tensile strength in the range of 9 to 11 MPa, an elongation at break of about 700 to 900%, and a Mooney viscosity (ML 1+4) of about 50 to 70 MU, see e.g., Brendan Rodgers, et al. "Advances in Tire Innerliner Technologies," *Rubber World*, Volume 234, Number 3, pp. 36-41 (June 2006), herein incorporated by reference.

However, in Compounds C1 and C2, where both the naphthenic processing oil and the phenolic tackifying resin were replaced with HPA, the Mooney scorch values were too low to be measured. This indicates that there is probability that these compounds would prematurely cure. Thus, the HPA may not be an adequate replacement for the phenolic resin as the cure stability was significantly reduced in the absence of the phenolic resin.

Nevertheless, when the phenolic tackifying resin and naphthenic processing oil were replaced with HPA in Compound C2, the oxygen permeation coefficient was reduced to 72 cc*mM/((m²-day). This is a 50% reduction in permeability versus Compound A1. This also represents nearly 60% reduction in permeation versus typical bromobutyl rubber tire innerliner compounds which may have a permeation coefficient of up to 220 cc*mm/(m²-day), see e.g., Brendan Rodgers, et al. "Advances in Tire Innerliner Technologies," *Rubber World*, Volume 234, Number 3, pp. 36-41 (June 2006).

In Compound C2, when TEA was added to the formulation, similar low permeation coefficients were obtained. TEA is believed to facilitate better montmorillonite clay dispersion. The tire innerliner compounds containing the HPA, with or without TEA, obtained significantly better impermeability (i.e., lower permeation coefficients) while maintaining other required compound mechanical properties.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A cured elastomeric composition comprising:
   a) at least one $C_4$-$C_7$ monoolefin elastomer;
   b) a hydrocarhon o t e additive, wherein the hydrocarbon polymer additive comprises a cyclic component and has an Mw in the range of about 500 to 700 g/mole and a Tg in the range of about 65 to 75° C.; wherein the hydrocarbon polymer additive comprises at least 75 wt % of cyclic components and
   c) a clay;
   wherein the composition has a permeation coefficient of 40° C. of 90 cc*mm/(m²-day) or less, and is substantially free of naphthenic oil.

2. The composition of claim 1, wherein the hydrocarbon polymer additive comprises dicyclopentadiene.

3. The composition of claim 1, wherein the composition has a permeation coefficient at 40° C. of less than 80 cc*mm/(m²-day) or less.

4. The composition of claim 1, wherein the at least one elastomer is selected from the group consisting of butyl rubber, halogenated butyl rubber, branched ("star-branched") butyl rubber, halogenated star-branched butyl rubber, poly (isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

5. The composition of claim 1, wherein the hydrocarbon polymer additive is present in the range of 10 phr to 40 phr.

6. The composition of claim 1, wherein the elastomeric composition further comprises one or more filler components selected from calcium carbonate, mica, silica, silicates, talc, titanium dioxide, starch, wood flour, carbon black, and mixtures thereof.

7. The composition of claim 1, wherein the clay is exfoliated and is selected from the group consisting of exfoliated natural or synthetic montmorillonite, nontronite, beidellite, volkonskoite, laponite, hectorite, saponite, sauconite, magadite, kenyaite, steensite, vermiculite, halloysite, aluminate oxides, hydrotalcite, and mixtures thereof.

8. The composition of claim 1, wherein the composition is an air barrier, a tire innerliner, an innertube, or a hose.

9. The composition of claim 1, wherein the composition comprises:
   a) at least one iso butylene-based elastomer;
   b) at least one hydrocarbon polymer additive, wherein the hydrocarbon polymer additive comprises dicyclopentadiene; and
   c) at least one exfoliated clay.

10. A cured elastomeric composition comprising:
    a) at least one $C_4$-$C_7$ monoolefin elastomer;
    b) a hydrocarbon polymer additive, wherein the hydrocarbon polymer additive comprises a cyclic component and has an Mw in the range of about 500 to 700 g/mole and a Tg in the range of about 65 to 75° C.; wherein the hydrocarbon polymer additive has a softening point in the range of about 115 to about 130° C.; and
    c) a clay;
    wherein the composition has a permeation coefficient at 40° C. of 90 cc*mm/(m²-day) or less, and is substantially free of naphthenic oil.

11. The composition of claim 10, wherein the at least one elastomer is selected from the group consisting of butyl rubber, halogenated butyl rubber, branched ("star-branched") butyl rubber, halogenated star-branched butyl rubber, poly (isobutylene-co-p-methylstyrene), halogenated poly(isobutylene-co-p-methylstyrene), general purpose rubber, natural rubber, polybutadiene ruber, polysoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

12. The composition of claim 10, wherein the hydrocarbon polymer additive is present in the range of 10 phr to 40 phr.

13. The composition of claim 10, wherein the hydrocarbon polymer additive comprises dicyclopentadiene.

14. The composition of claim 10, wherein the composition is an air barrier, a tire innerliner, an innertube, or a hose.

15. An air barrier comprising an elastomer composition made by the method of:
    a) combining at least one $C_4$-$C_7$ monoolefin based elastomer, at least one filler, at least one clay, and at least one hydrocarbon polymer additive, wherein the hydrocarbon polymer additive has a softening point in the range of about 115 to about 130° C. and comprises a cyclic component, and at least one cure agent, and wherein the composition is substantially free of naphthenic oil; and b) curing the combined components.

16. The air barrier of claim 15, wherein the air barrier is a tire innerliner, an innertube, or a hose.

17. The air barrier of claim 15, wherein the composition has a permeation coefficient at 40° C. of less than 90 cc*mm/(m$^2$-day) or less.

18. The air barrier of claim 15, wherein the at least one elastomer is selected from the group consisting of butyl rubber, halogenated butyl rubber, branched ("star-branched") butyl rubber, halogenated star-branched butyl rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

19. The air barrier of claim 15, wherein the clay is an exfoliated clay selected from the group consisting of exfoliated natural or synthetic montmorillonite, nontronite, volkonskoite, laponite, hectorite, saponite, sauconite, magadite, kenyaite, steensite, vermiculite, halloysite, aluminate oxides, hydrotalcite, and mixtures thereof.

20. The air barrier of claim 15, wherein the filler is selected from calcium carbonate, mica, silica, silicates, talc, titanium dioxide, starch, wood flour, carbon black, and mixtures thereof.

21. The composition of claim 15, wherein the hydrocarbon polymer additive comprises at least 75 wt % of cyclic components.

22. The composition of claim 15, wherein the hydrocarbon polymer additives has a Tg in the range of about 65 to 75° C.

23. An elastomeric composition comprising:

a) at least one $C_4$-$C_7$ monoolefin elastomer;

b) a hydrocarbon polymer additive, wherein the hydrocarbon polymer additive has a softening point in the range of about 115 to about 130° C. and comprises dicyclopentadiene; and c) a clay;

wherein the composition is substantially free of naphthenic oil.

24. The composition of claim 23, wherein the at least one elastomer is selected. from the group consisting of butyl rubber, halogenated butyl rubber, branched ("star-branched") butyl rubber, halogenated star-branched butyl. rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

25. The composition of claim 23, wherein the hydrocarbon polymer additives has a Tg in the range of about 65 to 75° C.

* * * * *